J. W. NOBLE.
COTTON CHOPPER.
APPLICATION FILED JAN. 6, 1908.

1,054,787.

Patented Mar. 4, 1913.
4 SHEETS—SHEET 1.

Witnesses:-

Inventor:-
John W. Noble
By
Peirce & Fisher
Attys.

J. W. NOBLE.
COTTON CHOPPER.
APPLICATION FILED JAN. 6, 1908.
1,054,787.
Patented Mar. 4, 1913.
4 SHEETS—SHEET 4.
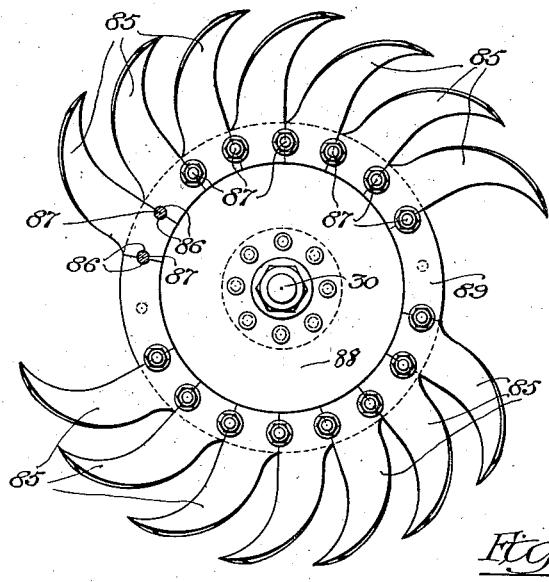
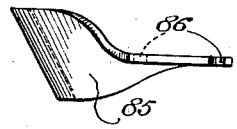
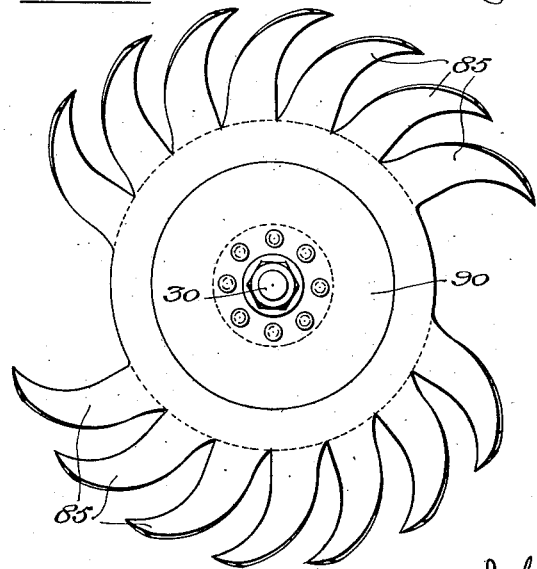
Witnesses:-
Inventor:-
John W. Noble
by Peirce & Fisher
Attys.

UNITED STATES PATENT OFFICE.

JOHN W. NOBLE, OF ANNISTON, ALABAMA.

COTTON-CHOPPER.

1,054,787. Specification of Letters Patent. Patented Mar. 4, 1913.

Application filed January 6, 1908. Serial No. 409,468.

*To all whom it may concern:*

Be it known that I, JOHN W. NOBLE, a citizen of the United States, and a resident of Anniston, county of Calhoun, State of Alabama, have invented certain new and useful Improvements in Cotton-Choppers, of which the following is a specification.

The invention relates to cotton-choppers and seeks to provide a simple and effective construction provided with variable cutter mechanism whereby the plants may be left at different distances apart in accordance with the varying conditions of the soil.

Further objects of the invention are to provide universal swivel connections and driving mechanism whereby the cotton-chopping knives and cultivating devices may be swung both laterally and vertically with respect to the traction wheels so that they may be kept accurately in line over the rows of plants even though the team may not be exactly in line.

The invention also seeks to provide means for automatically throwing the driving mechanism into and out of operation as the operating devices are raised and lowered, and to provide means for automatically locking the operating devices in raised position, together with devices for automatically releasing said locking means.

With these and other objects in view, the invention consists in the features of construction, combinations and arrangements of parts, hereinafter set forth, illustrated in the accompanying drawings, and more particularly pointed out in the appended claims.

Figure 1:
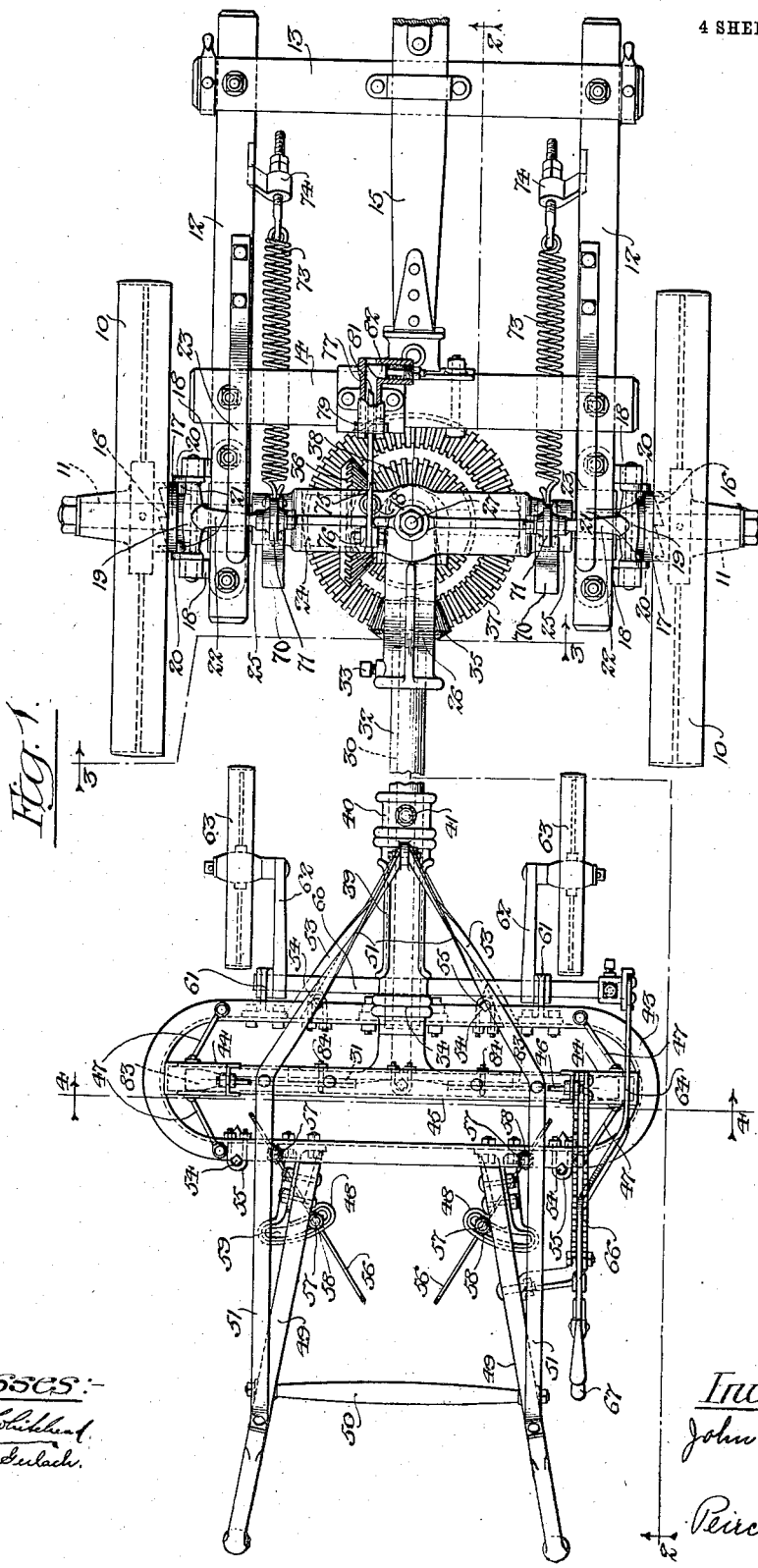
Figure 2:
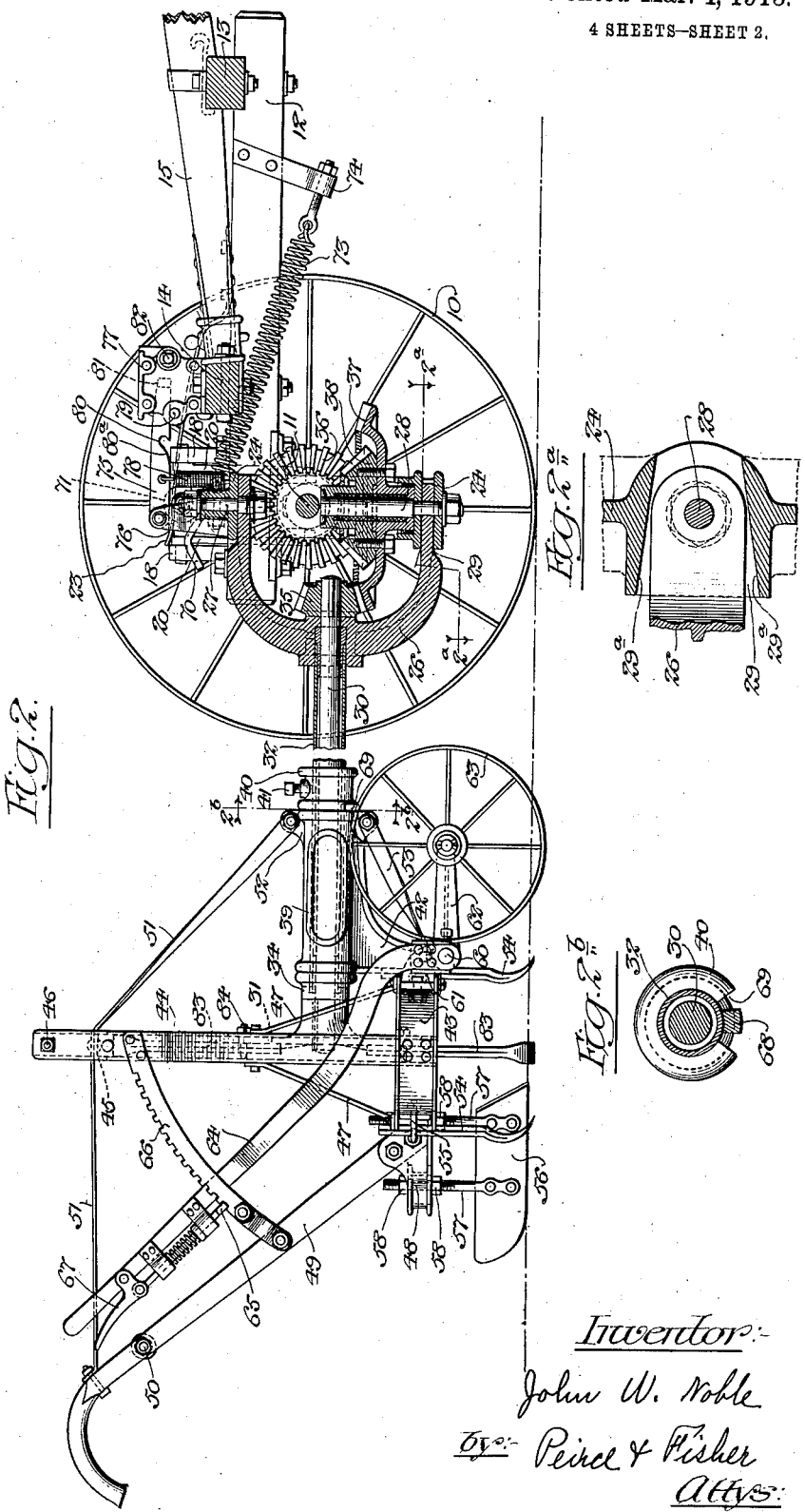
Figure 3:
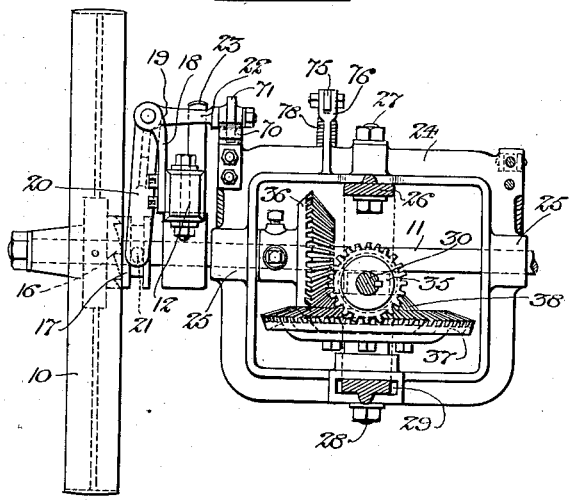
Figure 4:
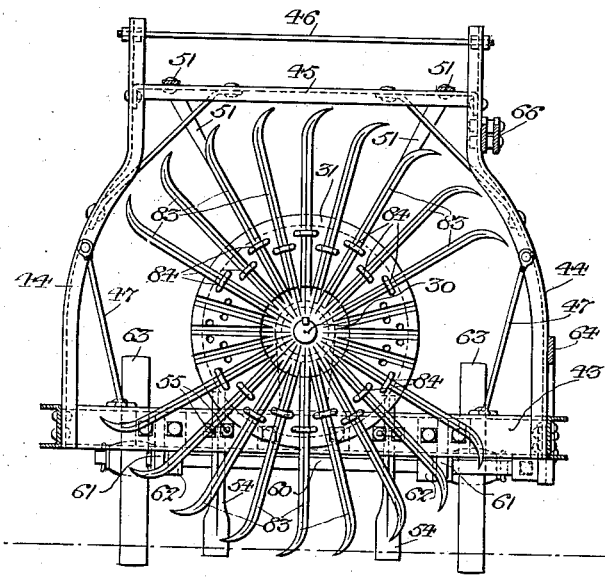

In the drawings, Figure 1 is a plan view of the improved cotton-chopper, Fig. 2 is a view in elevation with parts shown in sections on the line 2—2 of Fig. 1. Figs. 2ª and 2ᵇ are detail sections on lines 2ª—2ª and 2ᵇ—2ᵇ of Fig. 2. Fig. 3 is a cross-section on the line 3—3 of Fig. 1; Fig. 4 is a cross-section on the line 4—4 of Fig. 1; Figs. 5, 6 and 7 are detail views of the rotary cutter and knives therefor with modifications.

The traction wheels 10 of the machine are mounted upon the ends of an axle 11 that is journaled in suitable bearings fixed to the side-bars 12. These side-bars, together with a pair of connecting cross-bars 13 and 14, form a wheel truck which is preferably provided with a pole 15 and to which the team is connected in any suitable manner. The traction wheels 10 are preferably loosely mounted on the axle 11 and are arranged to be connected thereto by a suitable clutch mechanism. In the form illustrated, the hubs of the wheels are provided on their inner ends with clutch teeth 16 which are arranged to be engaged by the corresponding teeth of a pair of clutch sleeves 17 that are keyed to and slidably mounted upon the ends of the axle 11. To the rear ends of each of the side-bars 12 of the truck is secured a pair of upwardly projecting arms 18 between which are journaled a pair of bell-cranks 19. Each bell-crank has a pair of depending arms 20 provided with pins 21 that engage a groove in the adjacent clutch sleeve 17. Each bell-crank is also provided with an inwardly projecting arm 22 and these arms are engaged by a pair of flat springs 23 which tend to force the clutch sleeves 16 outwardly into engagement with the hubs of the traction wheels.

A rectangular frame 24 is provided with hubs or bearings 25 on its side portions through which the wheel axle 11 extends so that the frame is swiveled to swing upon the axle. A yoke 26 is connected to the upper and lower portions of the frame 24 by the pivot bolts or studs 27 and 28. The upper arm of the yoke 26 extends beneath the upper portion of the rectangular frame 24 and engages an enlarged portion on the lower end of the bolt or stud 27. The lower arm of the yoke extends within a socket 29 on the lower portion of the rectangular frame 24 and engages the lower reduced end of the pivot bolt or stud 28. The walls of the socket 29 (see Fig. 2ª) are provided with outwardly flaring or inclined portions 29ª which limit the lateral swing of the yoke 26 relatively to the frame 24. An operating shaft 30 is journaled at its forward end in the yoke 26 and extends longitudinally and rearwardly therefrom, and is provided at its rear end with a rotary chopping-cutter 31. The shaft is preferably surrounded by a tubular sleeve 32 which is fixed at its forward end to the yoke 26 by a set nut 33 (see Fig. 1). At its rear end the sleeve 33 is connected to a collar 34 that abuts against the hub of the rotary cutter 31. A beveled gear 35 is fixed to the forward end of the shaft 30 and a beveled gear 36 is fixed to the axle 11 adjacent one side portion of the frame 24. The beveled gear 35 meshes with a beveled gear 37 and the gear 36 meshes with a beveled gear 38. Gears 37 and 38 are connected together and are journaled upon the upper end of the vertical stud 28 that is carried by the frame 24.

A supporting sleeve 39 is swiveled upon the rear end of the tubular sleeve 32 which extends about the operating shaft 30. The sleeve 39 is held in place between the collar 34 and a collar 40 that is fixed to the tubular sleeve 32 by a set screw 41. The supporting sleeve 39 is provided with a depending portion 42 at its rear end which is secured to the front side of a transverse frame 43. This frame as shown is preferably made of a channel bar bent to an oval form. A pair of uprights 44 are fixed at their lower ends to the ends of the transverse frame and are upwardly and inwardly inclined therefrom. The upper ends of the uprights are connected by a cross channel bar 45 and a cross rod 46. Inclined brace bars 47 extend upwardly from the side portions of the frame 43 to the uprights 44. The rear portion of the transverse frame 43 is provided with a pair of rearwardly projecting brackets 48 to which a pair of guiding and controlling handles 49 are connected. These handles are connected by a transverse brace bar 50 also preferably braced by a pair of straps 51 that are secured to the upper portions of the handles and extend forwardly over the brace bar 45 and then downwardly and inwardly to a lug 52 on the forward end of the supporting sleeve 39. These straps are bolted or riveted to the cross-bar 45 and to the lug 52. A pair of inclined bracing studs 53 also extend between the forward portion of the sleeve 39 and the front portion of the transverse frame 43.

The transverse frame is provided with a series of cultivating devices preferably in the form of cultivator teeth 54 that are secured to the front and rear portions of the frame by U-bolts 55. The frame also carries a pair of scraper blades 56 of suitable form each of which is supported upon the lower ends of a pair of bolts 57. One bolt 57 of each pair extends through the rear portion of the frame 43 and the other bolt of the pair extends through a segmental slot in one of the brackets 48. By adjusting the nuts 58 on the bolts 57, the height and angle of the scrapers can be adjusted as desired.

A cross-shaft 60 is journaled in a pair of brackets 61 fixed to the front bar of the cross-frame 43. A pair of forwardly projecting arms 62 are fixed to the shaft 60 and carry a pair of wheels 63. The contact of these wheels with the ground determines the working depth of the rotary cutter 31 and of the cultivating devices and scrapers carried by the cross frame 43. The cross-shaft 60 is preferably adjustable in position by means of a lever 64 secured to one end thereto and provided with a spring dog 65 arranged to engage a notched segment 66 that is fixed to one of the handle bars 49 and to one of the uprights 44. The dog 65 is controlled by the usual finger piece 67 pivoted at the end of the lever 64. By shifting this lever the working depth of the rotary cutter and of the cultivating devices may be varied as desired. It should also be noticed that the supporting sleeve 39, the frame 43 and all parts carried thereby are free to rock or oscillate on the rear end of the tubular sleeve 32 so that the cultivating devices and scrapers carried by the frame will properly conform to the slope of the ground. The extent of this oscillating movement of the frame 43 is preferably limited by a lug 68 on the forward end of the sleeve 39 which sets within a segmental slot 69 in the collar 40 (see Fig. 2$^b$).

The rectangular frame 24 that is horizontally swiveled on the axle 11, and the yoke 26 which is vertically swiveled to the frame 24 form a universal connection between the axle and the operating shaft which carries the ground tools so that the ground tools may be shifted in vertical direction to and from working position, and may also be swung laterally relatively to the traction wheels 10 and axle 11. The operator may, therefore, by means of the handles 49 raise and lower the ground tools, and also guide them in line with the rows of plants, even though the team may turn slightly to one side or the other and not keep in a direct line.

The drive gearing formed of the beveled gears 35, 36, 37 and 38 is such as to properly connect the axle operating shaft in all of the different relative positions thereof. This drive gearing is automatically thrown into and out of operation as the parts are raised and lowered by a pair of inclined cam bars 70 that are fixed to the upper side portions of the rectangular frame 24 and which are arranged to engage rollers 71 on the ends of the arm 22 of the bell-cranks 19. By this means the clutch sleeves 17 are disengaged from the hubs of the traction wheels when the working parts of the machine are raised, so that the traction wheels alone revolve in turning corners or the like at the ends of the field. Moreover the working parts may be easily raised by the operator when desired, to skip a portion of the row where the plants are thin.

A pair of lift-springs 72 are connected at their rear ends to the upper side portions of the frame 24 and at their forward ends to lugs 73 fixed to the forward end of the side-bars 12, and these springs counterbalance the working parts of the machine so that they may be easily raised and lowered by the operator.

The working parts of the machine are automatically locked in elevated position by a latch-bar 75 that is pivoted at its rear end to an upwardly projecting arm 76 on the rectangular frame 24. The forward end of this latch extends into a box 77 that is fixed to the cross-bar 14 of the truck. A coiled spring 78 connected to the latch holds it in engagement with a cross stud 79 at the rear side of the box 77 and, when the working parts are raised a notch 80 on the under side of the latch engages the cross-stud 79 and locks the parts automatically in raised position. To automatically disengage the latch it is provided on its forward end with a beveled portion 81 which is arranged to engage the inner beveled end of a spring-held cross-bolt 82 at the forward side of the box 77. To disengage the latch the operator lifts the working parts slightly above their normal raised position and, when this is done the inclined rear portion $80^d$ of the notch 80 rides up on the stud 79 so as to lift the latch 75 until the spring-bolt 82 snaps under it and holds it lifted. The parts may then be lowered to working position since the notch 80 will not be engaged with the stud 79.

The cutting disk 31 shown in Figs. 1, 2 and 4 is provided with a series of knives 83 formed from bars that are square in section and that are removably and interchangeably held in place within suitable V-shaped seats in the disk by a series of U-bolts 84. The outer ends of these knives are curved and provided with cutting edges which are preferably arranged at an incline to the plane of rotation of the cutter so that they will operate with a draw cut. As indicated in Fig. 4, these knives are arranged in sets with blank spaces between the sets so that in chopping out the row, plants will be left at a certain predetermined distance apart, and by having the knives removably and interchangeably mounted on the cutting disk they may be arranged in two or more sets for leaving the plants at different distances apart in accordance with the varying conditions of the soil. For example, if the cutting disk is provided with eighteen teeth, the gearing is preferably set so that the planter will travel ahead thirty-six inches while the cutting disk is making one revolution. If, therefore, there are two sets of teeth with two blank spaces on the cutting disk, plants will be left every eighteen inches. By using three sets of teeth and three blank spaces plants will be left every twelve inches. By providing the cutting disk with twenty-four knives and arranging the gearing so that the machine will travel ahead forty inches for each revolution of the cutter, plants may be left twenty inches apart by providing two sets of knives, thirteen and one-third inches apart by providing three sets of knives and about six and a half inches apart by providing four sets of knives. In this way a wide variation in the operation of the cotton-chopper may be obtained and the machine is thus adapted for use with many different kinds of soil.

In Fig. 5 is illustrated a modified form of knife 85 that is formed of a piece of flat metal, the end of which is curved and provided with an inclined cutting edge, as indicated in Fig. 6. These knives are provided at their inner ends with notches 86 in their side edges so that they may be readily connected by bolts 87 to a suitable disk 88. They may be readily removed and changed or interchanged to provide two or more sets of knives for leaving the plants at different distances apart as desired. Pieces 89 having notches in their ends similar to those on the knives, may be arranged in the blank spaces.

Instead of having the knives detachably and interchangeably mounted upon the cutting disk, a series of cutting disks may be detachably and interchangeably mounted upon the end of the operating shaft 30, such a disk as illustrated at 90 in Fig. 7. These disks could be provided with differently arranged sets of teeth which would be adapted to chop out the rows, leaving plants at different distances apart in accordance with the varying conditions of the soil.

The driving lines from the team extend back over the machine and are passed between the cross bars 45 and 46 (see Fig. 4), so that they will be held out of the path of the cutting knives.

It is obvious that numerous changes may be made in the details set forth without departure from the essentials of the invention, as defined in the claims.

Having described my invention, what I claim as new and desire to secure by Letters Patent, is:—

1. In a cotton chopper, the combination with the axle and traction wheels thereon, a longitudinal operating shaft extending rearwardly from said axle, a universal coupling connecting said shaft and said axle, a cutter disk fixed to the rear end of said shaft and having a series of removable knives arranged in sets with blank spaces between the sets, said shaft and the cutter thereon being free to swing laterally and vertically, drive gearing connecting said axle and said shaft, a supporting member swiveled upon the rear end of said shaft and means carried thereby for guiding said cutter and for regulating the working depth thereof, substantially as described.

2. In cotton choppers, the combination with an axle, and traction wheels thereon, a coupling member journaled on said axle, a yoke vertically pivoted to said coupling member, a rearwardly extending operating shaft journaled at its forward end in said yoke, a cutter mounted on the rear end of said shaft, said shaft and cutter being laterally and vertically shiftable, drive gearing for connecting said axle and said shaft in all of the different relative positions thereof, a clutch member on said axle for connecting said gearing and one of said traction wheels, and a shifter for said clutch arranged to be engaged and operated by said coupling member, as said cutter is raised and lowered, substantially as described.

3. In cotton-choppers, the combination with a truck and a wheel axle journaled in said truck, of a pair of traction wheels loosely mounted on said axle, a longitudinally extending operating shaft, a universal connection between the forward end of said operating shaft and said wheel axle, a cutter mounted upon the rear end of said shaft, drive gearing for connecting said wheel axle and said shaft in all of its different positions, a pair of sliding clutch sleeves on said axle for connecting the same to said traction wheels, a pair of shifters for said clutch sleeves pivotally mounted on said truck, and a pair of cam devices connected to and moving with said universal connection for shifting said clutch sleeves into and out of operation as the shaft and cutter are moved to and from working position.

4. In cotton-choppers, the combination of a truck and a wheel axle journaled therein, of a pair of traction wheels loosely mounted on said axle, a longitudinally extending operating shaft, a rotary cutter mounted on said shaft, said shaft and cutter being shiftable to and from working position, drive gearing between said axle and said shaft, clutch mechanism for connecting said axle and said traction wheels, shifting means for said clutch mechanism mounted on said truck, and cam devices connected to and moved with said shaft arranged to operate said clutch-shifting means when said shaft and cutter are moved to and from working position.

5. In cotton-choppers, the combination with the wheel axle and the traction wheels mounted thereon, of a longitudinally extending operating shaft, a rotary cutter fixed to the rear end of said shaft, a universal connection between the forward end of said shaft and said wheel axle, whereby said shaft and cutter may be raised and lowered and swung in lateral direction, two pairs of beveled gears for connecting said axle and said shaft in all of the different relative positions thereof, and means for throwing said gears into and out of operation.

6. In cotton-choppers, the combination with the wheel axle and the traction wheels mounted thereon, of a longitudinally extending operating shaft, a rotary cutter mounted on the rear end of said shaft, a universal coupling connecting said shaft at its forward end to said axle whereby said shaft is shiftable to and from working position and laterally from side to side, drive gearing between said axle and said shaft, and a wheel frame swiveled upon the rear end of said shaft and laterally and vertically movable therewith and arranged to hold said cutter in working position.

7. In cotton-choppers, the combination with the wheel axle and the traction wheels mounted thereon, of an operating shaft, a rotary cutter fixed to the rear end of said operating shaft, said shaft being connected at its forward end to said wheel axle to shift vertically to and from working position, drive gearing between said axle and said shaft, and a supporting frame for holding said cutter in working position swiveled to the rear end of said shaft.

8. In cotton-choppers, the combination with the wheel axle and the traction wheels mounted thereon, of a longitudinally extending operating shaft, a rotary cutter fixed to the rear end of said shaft, universal connections between the forward end of said shaft and said wheel axle permitting the shift of said shaft and cutter vertically to and from working position and laterally from side to side, drive gears between said shaft and said axle, a frame swiveled upon the rear end of said shaft for holding said cutter in working position, and a pair of controlling handles secured to the frame.

9. In cotton-choppers, the combination with the wheel axle and the traction wheels mounted thereon, of a longitudinally extending operating shaft, a rotary cutter fixed to the rear end of said shaft, universal connections between the forward end of said shaft and said wheel axle permitting the shift of the shaft and cutter to and from working position and laterally from side to side, drive gearing between said axle and said shaft, a frame swiveled upon the rear end of said shaft and a pair of wheels mounted on said frame for holding the cutter in proper working position, said wheels being adjustable to vary the working position of said cutter.

10. In cotton-choppers, the combination with the wheel axle and the traction wheels mounted thereon, of a longitudinally extending operating shaft, a rotary cutter fixed to the rear end of said shaft, a universal connection between the forward end of said shaft and said wheel axle, drive gearing between said axle and said shaft, a wheeled frame swiveled upon the rear end of said shaft, and cultivating teeth and scrapers carried by said frame.

11. In cotton-choppers, the combination with the wheel axle and the traction wheels mounted thereon, of an operating shaft extending rearwardly from said axle, a rotary cutter fixed to the rear end of said shaft, a universal connection between the forward end of said shaft and said axle, drive gearing between said axle and said shaft, a frame journaled upon the rear end of said shaft, a pair of wheels mounted on said frame, and means for adjusting said wheels to vary the working height of said cutter.

12. In cotton-choppers, the combination with the wheel axle and the traction wheels mounted thereon, of a longitudinally extending operating shaft, a rotary cutter fixed to the rear end of said shaft, a universal connection between the forward end of said shaft and said wheel axle, two pairs of beveled gears connecting said axle and said shaft, a transverse frame journaled upon the rear end of said shaft, a pair of controlling handles fixed to said frame, cultivating devices carried by said frame, a pair of wheels mounted on said frame, and means on said frame for adjusting the height of said wheels to vary the working position of said cultivating devices and said cutter.

13. In cotton-choppers, the combination with the wheel axle and the traction wheels mounted thereon, of a frame swiveled upon said axle, a yoke vertically pivoted to said frame, an operating shaft journaled at its forward end in said yoke, a rotary cutter fixed to said shaft, beveled gears fixed respectively to the forward end of said shaft and to said axle, an intermediate connecting gearing between said beveled gears mounted on said frame.

14. In cotton choppers, the combination with the wheel axle and the traction wheels mounted thereon, of a rectangular frame swiveled on said axle, a yoke vertically swiveled to the upper and lower portions of said frame, an operating shaft journaled at its forward end in said yoke, a rotary cutter mounted on the rear end of said shaft, beveled gears fixed respectively to the forward end of said operating shaft and to said axle, a pair of intermediate beveled gears and a vertical stud fixed to said frame whereon said intermediate beveled gears are mounted.

15. In cotton-choppers, the combination with the wheel axle and the traction wheels mounted thereon, of a rearwardly extending operating shaft connected at its forward end to said axle to shift vertically to and from working position, drive gearing between said shaft and said axle, a rotary cutter fixed to the rear end of said shaft, a catch device for holding said operating shaft and cutter in its raised position, and means for automatically disengaging said catch device.

16. In cotton-choppers, the combination with the wheel axle and the traction wheels mounted thereon, of a longitudinally extending operating shaft connected at its forward end to said axle to shift vertically to and from working position, a rotary cutter on the rear end of said shaft, a supporting frame having a pair of guiding handles at the rear end of said shaft, an automatically acting spring-latch for holding said shaft and cutter in raised position and means for automatically disengaging said latch when shaft and cutter are lifted slightly above the normal raised position.

17. In cotton-choppers, the combination of a truck, a wheel axle journaled therein, traction wheels mounted on said axle, a rearwardly extending operating shaft connected at its forward end to said axle to shift vertically to and from working position, drive gearing between said axle and said shaft, a rotary cutter fixed to the rear end of said shaft, a wheeled frame at the rear end of said shaft for holding said cutter in working position, said frame having a pair of guiding and controlling handles, a spring-latch connected to the forward end of said shaft, a stud on said truck with which said latch automatically engages when the shaft and cutter are raised to hold the same in raised position, and a spring-trip for automatically disengaging said latch from said stud when the shaft and cutter are lifted slightly above the normal raised position.

18. In cotton-choppers, the combination with a truck, of an axle journaled in said truck, traction wheels loosely mounted on said axle, a rearwardly extending operating shaft, a universal connection between said operating shaft and said axle, beveled gearing arranged to connect said shaft and axle in all of the different relative positions thereof, a rotary cutter fixed to the rear end of said shaft, a wheeled frame swiveled to the rear end of said shaft for supporting said cutter in working position, said frame having a pair of guiding and controlling handles, clutch mechanism for connecting said traction wheels and said axle, means for shifting said clutch mechanism automatically into and out of operation as said shaft and cutter are shifted to and from working position, an automatically-acting catch for holding said shaft and cutter in raised position, and means for automatically disengaging said catch.

19. In cotton-choppers, the combination with the wheel axle and with the traction wheels mounted thereon, of clutch mechanism for connecting and disconnecting said traction wheels and said axle, a rectangular frame swiveled on said axle, a yoke vertically swiveled to the upper and lower portion of said rectangular frame, a longitudinally extending operating shaft journaled at its forward end in said yoke, beveled gears fixed to the forward end of said shaft and to said axle, intermediate beveled gears mounted on said rectangular frame, a rotary cutter fixed to the rear end of said shaft, a tubular sleeve surrounding said shaft and fixed at its forward end to said yoke, a transverse frame swiveled upon the rear end of said sleeve, said frame having a pair of operating and guiding handles, and cultivating devices and a pair of supporting wheels mounted on said frame.

20. In cotton choppers, the combination with the wheel axle and the traction wheels thereon, of a rearwardly extending operating shaft, a rotary cutter fixed to the rear end of said shaft, universal connections between the forward end of said shaft and said wheel axle, permitting the shift of said shaft and said cutter vertically and laterally, drive gears connecting said shaft and said axle, a frame having a limited swiveled movement upon the rear end of said shaft, means on said frame for holding said cutter in working position, and means connected to said frame for guiding said cutter, substantially as described.

21. In cotton choppers, the combination with the wheel axle and traction wheels thereon, of a frame journaled on said axle, a yoke vertically swiveled on said frame, a rearwardly extending sleeve fixed to said yoke, a shaft journaled within said sleeve, two pairs of beveled gears connecting said axle and said shaft, a rotary cutter fixed to the rear end of said shaft and a frame mounted on the rear end of said sleeve and having guiding and controlling means fixed thereto, substantially as described.

JOHN W. NOBLE.

Witnesses:
J. J. WILLETT,
R. S. THORNBERRY.